(12) United States Patent
Imanishi (10) Patent No.: US 12,541,903 B2
(45) Date of Patent: Feb. 3, 2026

(54) AVATAR GENERATION APPARATUS, AVATAR GENERATION METHOD, AND PROGRAM

(71) Applicant: NEC Corporation, Tokyo (JP)

(72) Inventor: Yoshiko Imanishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 154 days.

(21) Appl. No.: 18/387,519

(22) Filed: Nov. 7, 2023

(65) Prior Publication Data

US 2024/0169637 A1 May 23, 2024

(30) Foreign Application Priority Data

Nov. 18, 2022 (JP) .................................. 2022-185230

(51) Int. Cl.
*G06T 13/40* (2011.01)
*H04L 67/306* (2022.01)

(52) U.S. Cl.
CPC ............ *G06T 13/40* (2013.01); *H04L 67/306* (2013.01)

(58) Field of Classification Search
CPC .............................. G06T 13/40; H04L 67/306
See application file for complete search history.

(56) References Cited

U.S. PATENT DOCUMENTS

| 9,330,174 | B1* | 5/2016 | Zhang | G06F 16/95 |
| 11,870,936 | B1* | 1/2024 | Schwarz, Jr. | H04M 3/5233 |
| 2010/0097395 | A1* | 4/2010 | Chang | A63F 13/213 |
| | | | | 345/619 |
| 2011/0179062 | A1* | 7/2011 | Lee | G06F 16/9536 |
| | | | | 707/769 |
| 2021/0329320 | A1* | 10/2021 | Triantafyllou | H04N 21/812 |
| 2023/0069541 | A1* | 3/2023 | Acharya | G06Q 30/0643 |
| 2024/0070327 | A1* | 2/2024 | Monadjem | G06Q 40/04 |

FOREIGN PATENT DOCUMENTS

JP 2011-039570 A 2/2011

* cited by examiner

*Primary Examiner* — Daniel F Hajnik (57) ABSTRACT

Provided are an avatar generation apparatus, an avatar generation method, and a program that can reduce a user's time and effort when generating an avatar suitable for the user. An avatar generation apparatus includes: a data acquisition unit that acquires activity data of a user; a data estimation unit that estimates psychographic data of the user from the activity data of the user being acquired by the data acquisition unit; and an avatar generation unit that determines an appearance feature of an avatar by using the psychographic data estimated by the data estimation unit and thereby generates an avatar of the user.

14 Claims, 8 Drawing Sheets

AVATAR GENERATION APPARATUS, AVATAR GENERATION METHOD, AND PROGRAM

INCORPORATION BY REFERENCE

This application is based upon and claims the benefit of priority from Japanese patent application No. 2022-185230, filed on Nov. 18, 2022, the disclosure of which is incorporated herein in its entirety by reference.

TECHNICAL FIELD

The present disclosure relates to an avatar generation apparatus, an avatar generation method, and a program.

BACKGROUND ART

In recent years, avatars have been increasingly used in social networking services (SNSs), virtual spaces, and the like. A user desires to reflect his/her preference or the like in the avatar. However, it is a burden for the user to create an avatar desired by the user by himself/herself. In this connection, a technique in which an avatar generation apparatus generates an avatar has also been proposed. For example, Japanese Unexamined Patent Application Publication No. 2011-39570 discloses a technique of acquiring non-appearance information being information that cannot be identified from a user's appearance, and generating an avatar by using this information.

SUMMARY

In the technique described in Japanese Unexamined Patent Application Publication No. 2011-39570, information indicating a hobby or the like is stored in advance in a management apparatus, and an avatar generation apparatus generates an avatar reflecting the hobby or the like of a user by using the information stored in advance. However, it is not always easy to acquire psychographic data such as hobbies. When the user is requested to input his/her psychographic data, such data can be acquired, but the burden on the user is increased.

Therefore, an example object of the example embodiments disclosed in the present disclosure is to provide an avatar generation apparatus, an avatar generation method, and a program that are able to reduce a user's time and effort when generating an avatar suitable for the user.

In a first example aspect, an avatar generation apparatus includes:
- a data acquisition unit configured to acquire activity data of a user;
- a data estimation unit configured to estimate psychographic data of the user from the activity data of the user being acquired by the data acquisition unit; and
- an avatar generation un
it configured to determine an appearance feature of an avatar by using the psychographic data estimated by the data estimation unit and thereby generate an avatar of the user.

In a second example aspect, an avatar generation method includes:
- acquiring activity data of a user;
- estimating psychographic data of the user from the acquired activity data of the user; and
- determining an appearance feature of an avatar by using the estimated psychographic data and thereby generating an avatar of the user.

In a third example aspect, a program causes a computer to execute:
- a data acquisition step of acquiring activity data of a user;
- a data estimation step of estimating psychographic data of the user from the activity data of the user being acquired in the data acquisition step; and
- an avatar generation step of determining an appearance feature of an avatar by using the psychographic data estimated in the data estimation step and thereby generating an avatar of the user.

BRIEF DESCRIPTION OF DRAWINGS

The above and other aspects, features, and advantages of the present disclosure will become more apparent from the following description of certain example embodiments when taken in conjunction with the accompanying drawings, in which.

EXAMPLE EMBODIMENT

Outline of the Example Embodiments

Figure 1:
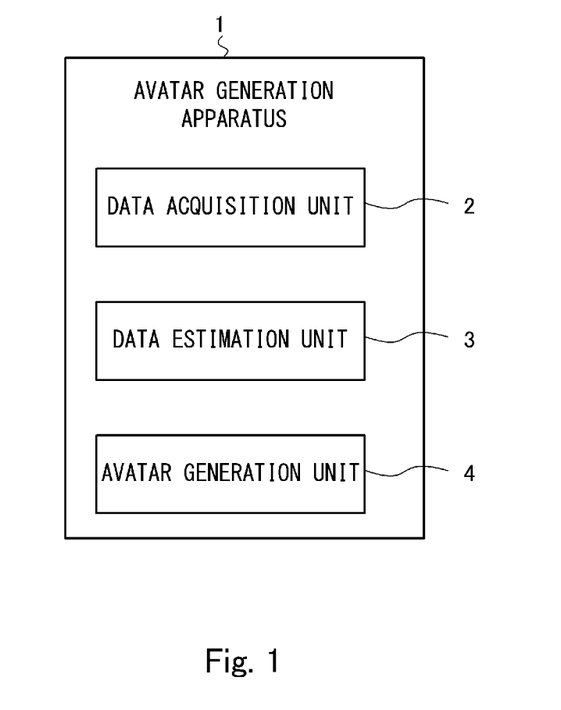
FIG. 1 is a block diagram illustrating a configuration example of an avatar generation apparatus according to the present disclosure.

Prior to the detailed description of the example embodiments, an outline of the example embodiments will be described with reference to FIG. 1. As illustrated in FIG. 1, the avatar generation apparatus 1 includes a data acquisition unit 2, a data estimation unit 3, and an avatar generation unit 4.

The data acquisition unit 2 acquires activity data of a user. Herein, the activity data are data specifying any activity performed by the user. The activity data may include data specifying any activity to be performed by the user (i.e., any activity that the user plans to perform). The data estimation unit 3 estimates psychographic data of the user from the activity data of the user acquired by the data acquisition unit 2. The psychographic data are data indicating psychological characteristics of the user, and may also be referred to as data indicating characteristics relating to the subjectivity of the user. The avatar generation unit 4 determines an appearance feature of an avatar by using the psychographic data estimated by the data estimation unit 3 to thereby generate an avatar of the user. Herein, the avatar refers to an agent being used as a user's other self in an application, a virtual space, or the like. The avatar is represented by, for example, a two-dimensional or three-dimensional object. The avatar may be a still image or a moving image, or may be composed of letters or graphics.

Figure 2:
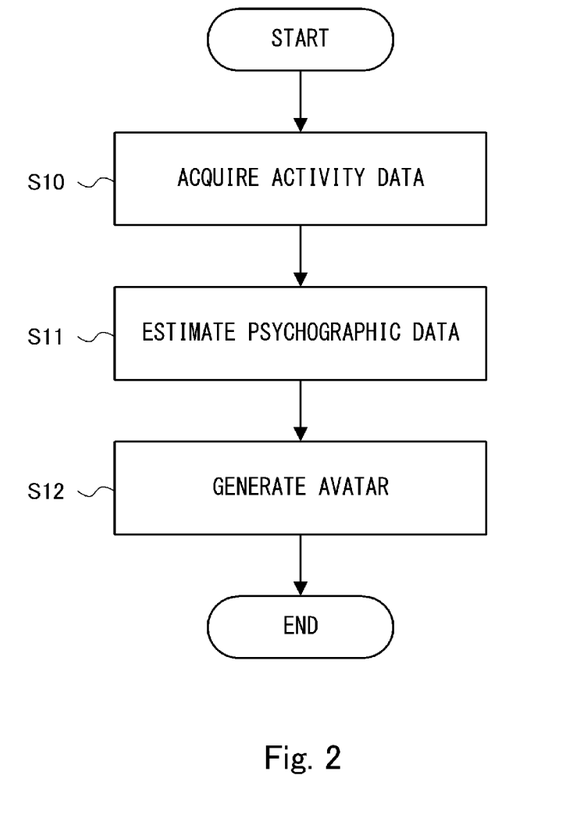
FIG. 2 is a flowchart illustrating an example of an operation flow of the avatar generation apparatus according to the present disclosure.

Hereinafter, an example of the operation flow of the avatar generation apparatus 1 will be described with reference to FIG. 2.

In step S10, the data acquisition unit 2 acquires activity data of the user.

Next, in step S11, the data estimation unit 3 estimates psychographic data of the user from the activity data of the user acquired in step S10.

Next, in step S12, the avatar generation unit 4 determines an appearance feature of an avatar by using the psychographic data estimated in step S11 to thereby generate an avatar of the user.

According to the avatar generation apparatus 1, the data estimation unit 3 estimates the psychographic data of the user from the activity data of the user acquired by the data acquisition unit 2. Then, the avatar generation unit 4 generates an avatar by using the estimated data. Therefore, the avatar generation apparatus 1 is able to generate an avatar reflecting the psychographic data of the user without acquiring the psychographic data from the user. Therefore, the user does not need to input his/her psychographic data when generating an avatar. Therefore, according to the avatar generation apparatus 1, it is possible to reduce a user's time and effort when generating an avatar suitable for the user. Further, according to the avatar generation apparatus 1, even when it is difficult to acquire psychographic data being managed by another system due to a problem such as security problem, it is possible to generate an avatar suitable for the user.

Hereinafter, the details of the example embodiments will be described.

First Example Embodiment

Figure 3:
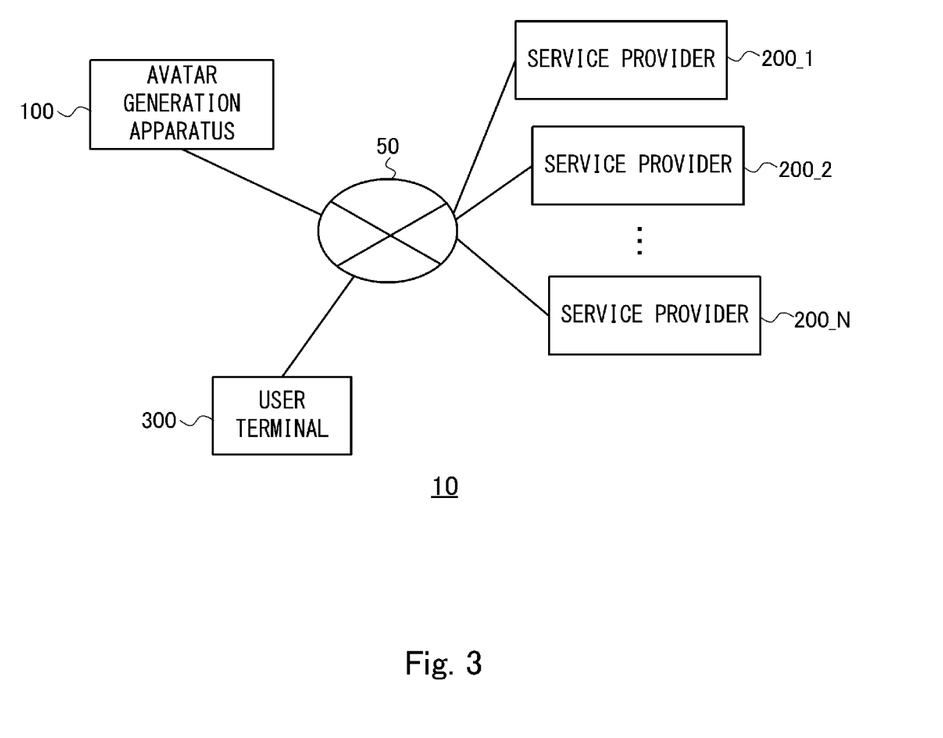
FIG. 3 is a block diagram illustrating a configuration example of an information processing system according to the present disclosure.

An information processing system 10 according to the first example embodiment will be described with reference to FIG. 3. As illustrated in FIG. 3, the information processing system 10 includes an avatar generation apparatus 100, service providers 200_1, 200_2, . . . , 200_N, and a user terminal 300.

Note that, in the following description, when referring to the service providers 200-1, 200_2, . . . , 200_N without any particular distinction among each other, such service provider will be referred to as a service provider 200. In the example illustrated in FIG. 3, the information processing system 10 includes N service providers 200 (where N is an integer of 1 or more), but the information processing system 10 may not necessarily include the service provider 200. For example, in a case where the avatar generation apparatus 100 acquires activity data from a source other than the service provider 200, the information processing system 10 may not necessarily include the service provider 200.

In the example illustrated in FIG. 3, the avatar generation apparatus 100, the service provider 200, and the user terminal 300 are communicably connected to each other via a network 50 such as the Internet.

Each service provider 200 is a system for providing a service to a user. More specifically, each service provider 200 is a system operated and managed by an operator providing a service. The service provided by the service provider 200 may be a service using the network 50. For example, such services include, but are not limited to, operation of a shopping site for selling products or services, provision of digital contents such as video and music, operation of a social networking service (SNS), operation of a search engine, operation of a portal site, and the like. Each service provider 200 may provide a different type of service or may provide the same type of service.

Each service provider 200 accumulates activity data generated as a result of the use of the service for each user who uses the service provided by the service provider 200. That is, each service provider 200 holds activity data for each user. Specifically, for example, each service provider 200 stores activity data in a storage device in a system that constitutes the service provider 200. For example, the activity data generated as a result of the use of the service may be a purchase history of a product or a service. Herein, the products may include digital contents. In this manner, the activity data may be data representing an activity of purchasing a product or a service by the user. In addition, the activity data generated as a result of the use of the service may be a viewing history of a video or a listening history of music. In this manner, the activity data may be data representing an activity of viewing a video or listening to music by the user. The activity data generated as a result of the use of the service may be a browsing history of a website. In this manner, the activity data may be data representing an activity of viewing a website by the user. In addition, the activity data generated as a result of the use of the service may be a history of posting a comment, an article or the like, a history of a search using a search engine, a history of an evaluation given by the user for any content, such as a product, a service, a digital content, an article, or a comment. In this manner, the activity data may be data representing an activity of inputting information by the user to a service provided over the network 50, such as the Internet. That is, the activity data may be data indicating the content of a user's posting via the network 50, data indicating a search condition input to the search engine, or data indicating a user's evaluation of any content provided on the network 50. Note that, these are merely examples, and the service provider 200 may hold other activity data.

The user terminal 300 is a terminal apparatus used by a user, and is, for example, a smart phone, a tablet terminal, a personal computer (PC), or the like. The user terminal 300 is employed in order for the user to use a service provided by the service provider 200. In the present example embodiment, the user terminal 300 is also employed in order for the user to use the avatar generation apparatus 100.

Figure 4:
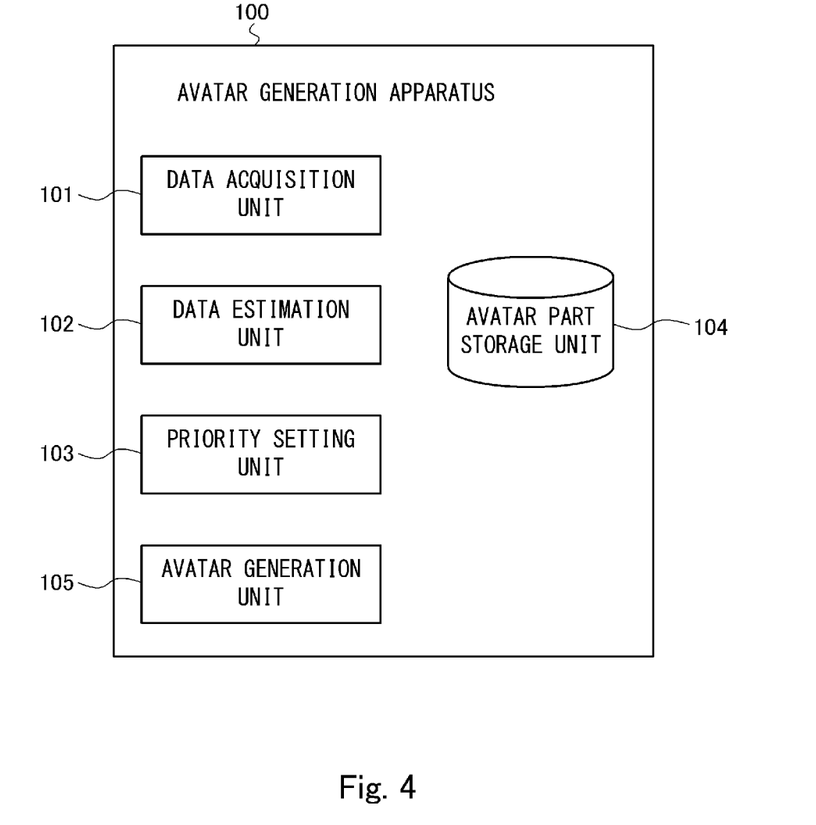
FIG. 4 is a block diagram illustrating a functional configuration of an avatar generation apparatus according to the present disclosure.

The avatar generation apparatus 100 is a specific example of the avatar generation apparatus 1 of FIG. 1, and is an apparatus that generates an avatar of the user. A functional configuration of the avatar generation apparatus 100 will be described with reference to FIG. 4. As illustrated in FIG. 4, the avatar generation apparatus 100 includes a data acquisition unit 101, a data estimation unit 102, a priority setting unit 103, an avatar part storage unit 104, and an avatar generation unit 105.

Note that, all of the components of the avatar generation apparatus 100 may not be included in a single apparatus, and the components of the avatar generation apparatus 100 may be distributed among a plurality of apparatuses. That is, the processing of the avatar generation apparatus 100 may be distributed by a group of apparatuses including a plurality of apparatuses. In such a case, the group of apparatuses may be referred to as an avatar generation apparatus.

The data acquisition unit 101 acquires data to be used for generating an avatar. Specifically, the data acquisition unit 101 acquires activity data of the user. For example, the data acquisition unit 101 acquires activity data of the user held by the service provider 200 from the service provider 200, but may acquire activity data other than the activity data held by the service provider 200. For example, activity data of the user held by the user terminal 300 may be acquired. For example, the data acquisition unit 101 may acquire, as the activity data of the user, data indicating the history of the user's exercise held by the user terminal 300 from the user terminal 300. In this manner, the activity data may be data representing activities related to the user's exercise. Note that the data indicating the history of the user's exercise may be the history of exercise observed by a sensor included in the user terminal 300. The activity data regarding exercise may also include data specifying a specific sport. In addition, the data acquisition unit 101 may acquire activity data of the user from a device (for example, a smart watch or the like) different from the user terminal 300 or the service provider 200. The activity data being acquired by the data acquisition unit 101 are not limited to data specifying an already performed activity, and may be data specifying an activity to be performed by the user (i.e., an activity that the user plans to perform).

Further, the data acquisition unit 101 may acquire data other than the activity data as data to be used for generating an avatar. For example, the data acquisition unit 101 may acquire character data. Herein, the character data are data representing the appearance of a character, and is, for example, an image acquired by capturing the appearance of the user (for example, the face of the user), but is not limited thereto. That is, the character described herein may be the user himself/herself, or may be any character that the user likes. The character may be a person, an animal, or an imaginary creature. A character as an imaginary creature includes, for example, a character appearing in video works such as animation and game software, a character designed as a symbol of a predetermined organization, and the like, but is not limited thereto. In this manner, the data acquisition unit 101 may acquire character data regarding a specific character. In the present example embodiment, the data acquisition unit 101 acquires character data transmitted from the user terminal 300. For example, in order to generate an avatar, the user operates the user terminal 300 to transmit data representing the user's appearance or data representing the user's favorite character's appearance (e.g., an image) to the avatar generation apparatus 100. Note that the data acquisition unit 101 may acquire character data from any of the service providers 200. Character data are acquired and used for generating an avatar, thereby enabling generation of an avatar being more preferable for the user.

Further, the data acquisition unit 101 may acquire demographic data of the user as data to be used for generating an avatar. Herein, the demographic data are data indicating objective characteristics of the user such as age, sex, occupation, and the like, and may be also referred to as data based on demographics. In the present example embodiment, the data acquisition unit 101 acquires demographic data transmitted from the user terminal 300. For example, in order to generate an avatar, the user operates the user terminal 300 to transmit demographic data of the user to the avatar generation apparatus 100. Note that the data acquisition unit 101 may acquire demographic data held by any of the service providers 200 from the service provider 200. Demographic data are acquired and used for generating an avatar, thereby enabling generation of an avatar reflecting demographic data of the user.

In the present example embodiment, the psychographic data are acquired by estimation processing performed by the data estimation unit 102, but the data acquisition unit 101 may acquire psychographic data other than the estimated psychographic data. In such a case, the data acquisition unit 101 may acquire the psychographic data from the user terminal 300 or from the service provider 200.

The data estimation unit 102 estimates the psychographic data of the user from the activity data of the user acquired by the data acquisition unit 101. The data estimation unit 102 may estimate the psychographic data according to a predetermined estimation rule. That is, the data estimation unit 102 may perform estimation processing by using an estimation rule that defines a certain item of psychographic data and a condition of the activity data required for associating the item of psychographic data with the user. In such a case, the data estimation unit 102 estimates the psychographic data of the user by determining whether the activity data acquired by the data acquisition unit 101 satisfy the condition defined in the estimation rule.

For example, when activity data regarding purchase of a specific product or a specific service are acquired, the data estimation unit 102 may estimate psychographic data indicating that the user has a predetermined preference as psychographic data of the user. As a specific example, the data estimation unit 102 may estimate, as psychographic data of a user who has purchased a product of a specific color, psychographic data indicating that the user prefers the specific color. Further, the data estimation unit 102 may estimate, as psychographic data of a user who has purchased a product or a service belonging to a specific category, psychographic data indicating that the user prefers the specific category. Further, for example, when activity data regarding purchase of a product or the like are acquired, the data estimation unit 102 may estimate psychographic data indicating whether the user prefers a luxurious atmosphere as psychographic data of the user, based on the purchased target, the purchased amount, or the like.

Further, for example, when activity data regarding viewing of a specific video or listening to a specific music are acquired, the data estimation unit 102 may estimate psychographic data indicating that the user has a predetermined preference as psychographic data of the user. As a specific example, the data estimation unit 102 may estimate, as psychographic data of a user who has viewed a video of a specific genre or listened to music of a specific genre, psychographic data indicating that the user prefers the specific genre. Further, the data estimation unit 102 may estimate, as psychographic data of the user, psychographic data indicating a preference (e.g., a preference for a bright atmosphere or a preference for a dark atmosphere) correlated with the specific genre.

Further, for example, when activity data regarding browsing of a website in which a specific content is described are acquired, the data estimation unit 102 may estimate psychographic data indicating that the user has a predetermined preference as psychographic data of the user. As a specific example, the data estimation unit 102 may estimate, as psychographic data of a user who browses a website in which a specific content is described, psychographic data indicating a preference correlated with the specific content. More specifically, for example, the data estimation unit 102 may estimate, as psychographic data of the user, psychographic data indicating that a specific category is preferred, psychographic data indicating a positive orientation or a negative orientation, or the like.

Similarly, for example, when activity data regarding a posting history is acquired, the data estimation unit 102 may estimate psychographic data indicating a preference correlated with the posted content as psychographic data of the user. Further, for example, when activity data regarding a search history are acquired, the data estimation unit 102 may estimate psychographic data indicating a preference correlated with the searched target as the psychographic data of the user. Further, for example, when activity data for giving a predetermined evaluation to a content are acquired, the data estimation unit 102 may estimate psychographic data indicating that the user has a predetermined preference as psychographic data of the user. As a specific example, the data estimation unit 102 may estimate, as psychographic data of a user who gives a high evaluation to a specific content, psychographic data indicating that the user prefers the specific content itself or an object related to the specific content. Similarly, the data estimation unit 102 may estimate, as psychographic data of a user who gives a low evaluation to a specific content, psychographic data indicating that the user does not like the specific content itself or the object related to the specific content.

Further, for example, when activity data regarding exercise is acquired, the data estimation unit 102 may estimate psychographic data indicating that the user has a predetermined preference as the psychographic data of the user. As a specific example, the data estimation unit 102 may estimate, as psychographic data of a user who exercises at a frequency equal to or higher than a predetermined frequency, psychographic data indicating that the user prefers exercise, or psychographic data indicating that the user prefers sporty feeling. Further, the data estimation unit 102 may estimate, as psychographic data of a user who plays a specific sport, psychographic data indicating that the user prefers the specific sport.

As described above, some specific examples of the estimation of the psychographic data performed by the data estimation unit 102 have been described, but these are merely examples, and the estimation processing may be performed in accordance with an estimation rule other than the estimation rules shown in the specific examples described above. That is, the data estimation unit 102 need only to estimate the psychographic data corresponding to the activity data. Further, the data estimation unit 102 may estimate the psychographic data by using a machine learning model instead of an estimation rule. In such a case, the data estimation unit 102 performs, for example, estimation processing by using a machine learning model trained in advance using data in which the activity data of the user and the psychographic data are associated with each other as training data. Note that, the machine learning model being used in the estimation processing does not necessarily have to be trained by supervised learning, and a model trained by unsupervised learning may be used. Further, in order to more appropriately estimate the current preference of the user, the data estimation unit 102 may perform the estimation processing by using only activity data of an activity at a time point newer than a predetermined time point in the past. In other words, the data estimation unit 102 may perform the estimation processing on items of the activity data acquired by the data acquisition unit 101, except for items of the activity data regarding old activities in the past before the predetermined time point.

The priority setting unit 103 sets a priority for a plurality of types of data to be used for determining the appearance features of the avatar. For example, the priority setting unit 103 sets a priority for each type of data to be used when two or more types of data out of three types of data consisting of psychographic data, character data, and demographic data are used. The priority setting unit 103 may set a predetermined priority for the plurality of types of data. That is, the priorities of the psychographic data, the character data, and the demographic data may be determined in advance. Further, the priority setting unit 103 may set a plurality of patterns of combination of priorities for the plurality of types of data to be used for determining the appearance features of the avatar. For example, the priority setting unit 103 may set two or more patterns of combination of priorities among three patterns described below. The first pattern of combination of priorities is a combination of priorities set for each item of various types of data so as to give the highest priority to the psychographic data. The second pattern of combination of priorities is a combination of priorities set for each item of various types of data so as to give the highest priority to the character data. The third pattern of combination of priorities is a combination of priorities set for each item of various types of data so as to give the highest priority to the demographic data.

The priority setting unit 103 does not necessarily have to set a predetermined priority for a plurality of types of data. The priority setting unit 103 may accept an instruction to specify a priority from the user and set the priority according to the accepted instruction. In such a case, in order to generate an avatar, the user operates the user terminal 300 to transmit the instruction to specify the priority of various types of data to the avatar generation apparatus 100.

The avatar part storage unit 104 stores data representing parts (hereinafter referred to as part data) for various parts constituting the avatar. The part data are, for example, an image of each part, but may be data of another format. The various parts that constitute the avatar include, but are not limited to, for example, the face, body, hair style, clothing, hat, footwear, personal belongings, accessories, background, and the like. The avatar part storage unit 104 stores part data of different variations for each part. For example, as variations, part data having different colors, shapes, and the like are stored. The avatar part storage unit 104 stores each item of the part data in association with specific psychographic data or specific demographic data. For example, part data representing red clothes are stored in association with psychographic data indicating a preference for the color red, and part data representing a soccer ball are stored in association with psychographic data indicating a preference for soccer. Further, part data representing the face of a male elderly person are stored in association with demographic data indicating that the age is 70 years or older, and part data representing a hat of a police officer are stored in association with demographic data indicating that the occupation is a police officer. Note that, these are merely examples, and psychographic data or demographic data associated with each item of part data are not limited to the above-described examples.

The avatar generation unit 105 determines the appearance features of the avatar by using the data acquired for the user to thereby generate the avatar of the user. Herein, the data acquired for the user refers to at least one of the psychographic data acquired by the estimation made by the data estimation unit 102, the character data, the demographic data, or the psychographic data acquired by the data acquisition unit 101. Therefore, the avatar generation unit 105 generates the avatar by using at least one of these data items. Herein, description is made on the assumption that the avatar generation unit 105 generates an avatar by using at least the psychographic data estimated by the data estimation unit 102.

The avatar generation unit 105 selects part data related to the acquired psychographic data or demographic data. When the character data are being acquired, the avatar generation unit 105 may generate the face of the avatar by using the character data. Selecting the part data and using the character data correspond to determining the appearance features of the avatar. In this way, the avatar generation unit 105 generates the avatar of the user by determining the appearance features of the avatar by using the data acquired for the user. If data acquired for the user is insufficient, the avatar generation unit 105 may not be able to select appropriate part data. In such a case, the avatar generation unit 105 may generate an avatar by using the part data defined as the default part data. The avatar generation unit 105 generates an image of the avatar by, for example, synthesizing the selected part data and the character data.

When the priority setting unit 103 sets a priority for a plurality of types of data, the avatar generation unit 105 generates an avatar according to the set priority. At this time, the avatar generation unit 105 may generate the avatar according to the priority set by a user's instruction. As described above, the priority indicates which of the psychographic data, the character data, and the demographic data are prioritized. For example, it is assumed that part data of a hat A is stored in the avatar part storage unit 104 in association with psychographic data X, and part data of a hat B is stored in association with demographic data Y. At this time, when the avatar of the user having the psychographic data X and the demographic data Y is generated, the avatar generation unit 105 selects part data according to the priority. For example, when the priority of the psychographic data is higher than the priority of the demographic data, the avatar generation unit 105 generates an avatar by using the part data of the hat A. Further, for example, when the priority of the character data is set higher than the priority of the demographic data, the avatar generation unit 105 determines the face of the avatar as follows. In such a case, if the data acquisition unit 101 acquires the character data for a user having demographic data Z, the face of the avatar is generated by using the acquired character data instead of face part data associated with the demographic data Z. As described above, the avatar can be generated more appropriately by setting the priority and generating an avatar according to the priority. In particular, when the priority is set according to a user's instruction, the user can generate an avatar more freely than when setting according to a user's instruction is not permitted.

As described above, the priority setting unit 103 may set a plurality of patterns of combination of priorities for a plurality of types of data. In such a case, the avatar generation unit 105 generates an avatar according to the priority for each of the plurality of patterns of combination of priorities. That is, in such a case, the avatar generation unit 105 generates an avatar for each pattern. Then, the avatar generation unit 105 accepts, from the user, an instruction to select one of the generated avatars. The avatar generation unit 105 adopts the avatar selected according to the instruction as the avatar of the user. For example, the user operates the user terminal 300 to transmit, to the avatar generation apparatus 100, an instruction to select an avatar determined to be the most appropriate among the generated avatars. In this way, by setting a plurality of patterns of combination of priorities, the user can easily generate an avatar preferable for the user.

Further, the avatar generation unit 105 may accept an instruction to select part data from the user and generate an avatar by using the part data selected according to the accepted instruction. For example, the user operates the user terminal 300 to transmit, to the avatar generation apparatus 100, an instruction to select preferable part data.

In addition, the avatar generation unit 105 may generate an avatar having a predetermined appearance feature only when predetermined activity data are acquired. That is, the avatar generation unit 105 may prohibit a user who has not acquired predetermined activity data from generating an avatar having a predetermined appearance feature. For example, the avatar generation unit 105 may permit the use of part data of a luxurious accessory only to a user who has purchased a specific product (for example, a high-value ornament) or a user whose purchased amount in a predetermined period exceeds a reference value. In the present example embodiment, as described above, psychographic data are estimated from the activity data. Therefore, the avatar generation unit 105 may generate an avatar having a predetermined appearance feature only when predetermined psychographic data are estimated from the activity data of the user. For example, the avatar generation unit 105 may permit the use of the part data of a luxurious accessory only when the psychographic data indicating that the user prefers a luxurious atmosphere is estimated. Note that, these are merely examples, and the avatar generation unit 105 may restrict the use of other part data, based on the activity data or the psychographic data. In this way, by imposing restrictions on the generation of the avatar, based on the activity data or the psychographic data, it is possible to generate an avatar that matches the actual person image of the user.

Next, an example of a hardware configuration of the avatar generation apparatus 100, the service provider 200, and the user terminal 300 will be described. An example of a hardware configuration of the avatar generation apparatus 100 and the service provider 200 will be described with reference to FIG. 5. The avatar generation apparatus 100 and the service provider 200 each include a network interface 60, a memory 61, and a processor 62.

Figure 5:
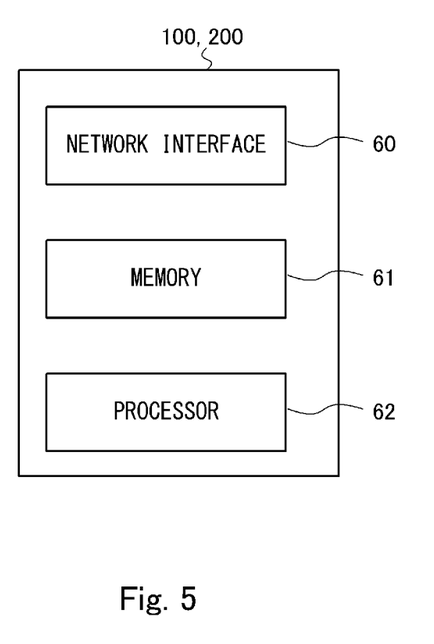
FIG. 5 is a block diagram illustrating an example of a hardware configuration of the avatar generation apparatus and a service provider according to the present disclosure.

The network interface 60 is being used for communication via the network 50. The network interface 60 may include, for example, a network interface card (NIC).

The memory 61 includes, for example, a combination of a volatile memory and a non-volatile memory. The memory 61 is being used for storing programs to be executed by the processor 62, data to be used for processing, and the like. The avatar part storage unit 104 described above may be achieved by a storage device such as the memory 61 of the avatar generation apparatus 100.

The processor 62 performs processing of the avatar generation apparatus 100 or the service provider 200 by reading and executing a program from the memory 61. The processing of the data acquisition unit 101, the data estimation unit 102, the priority setting unit 103, and the avatar generation unit 105 described above are performed, for example, by the processor 62 of the avatar generation apparatus 100 reading and executing a program from the memory 61 of the avatar generation apparatus 100. The processor 62 may be, for example, a microprocessor, a microprocessor unit (MPU), a central processing unit (CPU), or the like. The processor 62 may include a plurality of processors.

Figure 6:
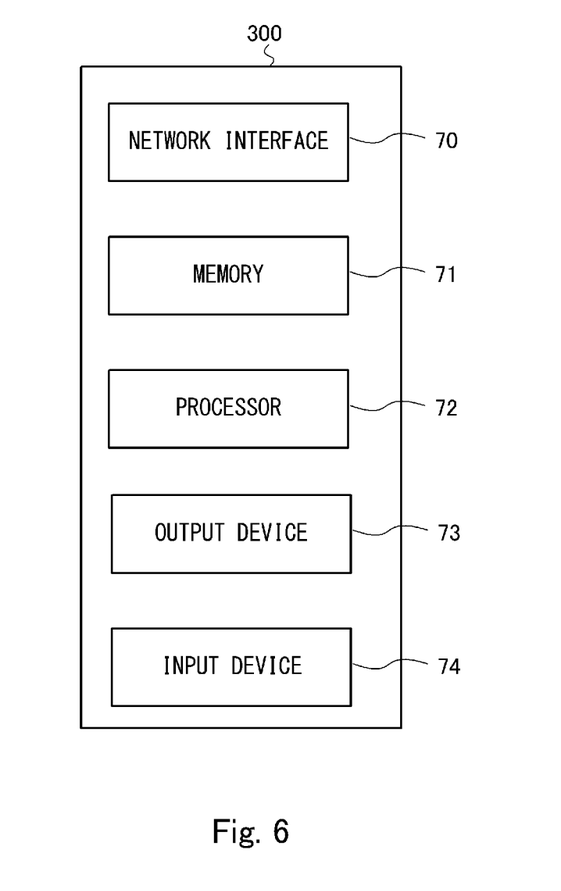
FIG. 6 is a block diagram illustrating an example of a hardware configuration of a user terminal according to the present disclosure.

An example of a hardware configuration of the user terminal 300 will be described with reference to FIG. 6. The user terminal 300 includes a network interface 70, a memory 71, a processor 72, an output device 73, and an input device 74.

The network interface 70 is being used for communication via the network 50. The network interface 70 may include, for example, a network interface card (NIC).

The memory 71 includes, for example, a combination of a volatile memory and a non-volatile memory. The memory 71 is being used for storing programs to be executed by the processor 72, data to be used for processing, and the like.

The processor 72 performs processing of the user terminal 300 by reading and executing a program from the memory 71. The processor 72 may be, for example, a microprocessor, an MPU, a CPU, or the like. The processor 72 may include a plurality of processors.

The output device 73 is an output device such as a display that outputs information to the outside. The display may be, for example, a flat panel display such as a liquid crystal display, a plasma display, or an organic electroluminescence (EL) display. The avatar generation unit 105 may transmit the generated image of the avatar to the user terminal 300, and in such a case, the output device 73 may display the received image of the avatar. In addition, the avatar generation unit 105 may provide a graphical user interface (GUI) for generating an avatar to the user terminal 300, and the output device 73 may display the GUI.

The input device 74 is a device for a user to perform input, and is an input device including a pointing device and the like. The input device 74 and the output device 73 may be integrally configured as a touch panel. The input device 74 may include a device other than a pointing device, such as a keyboard.

As described above, the avatar generation apparatus 100, the service provider 200, and the user terminal 300 have functions as a computer. When the program is read by the computer, the program includes instructions (or software codes) for causing the computer to execute one or more functions described in the example embodiment. The program may be stored in a non-transitory computer-readable medium or a tangible recording medium. Although not limited thereto, examples of the computer-readable medium or the tangible recording medium include a random-access memory (RAM), a read-only memory (ROM), a flash memory, a solid-state drive (SSD), or other memory techniques, a CD-ROM, a digital versatile disc (DVD), a Blu-ray (registered trade name) disc, or other optical disc storages, a magnetic cassette, a magnetic tape, a magnetic disc storage, and other magnetic storage devices. The program may be sent on a transitory computer-readable medium or a communication medium. Although not limited thereto, examples of the transitory computer-readable medium or the communication medium include electrical, optical, acoustic, or other forms of propagating signals.

Next, an operation of the avatar generation apparatus 100 according to the present example embodiment will be described. Hereinafter, an example of the operation flow of the avatar generation apparatus 100 will be described with reference to FIG. 7.

Figure 7:
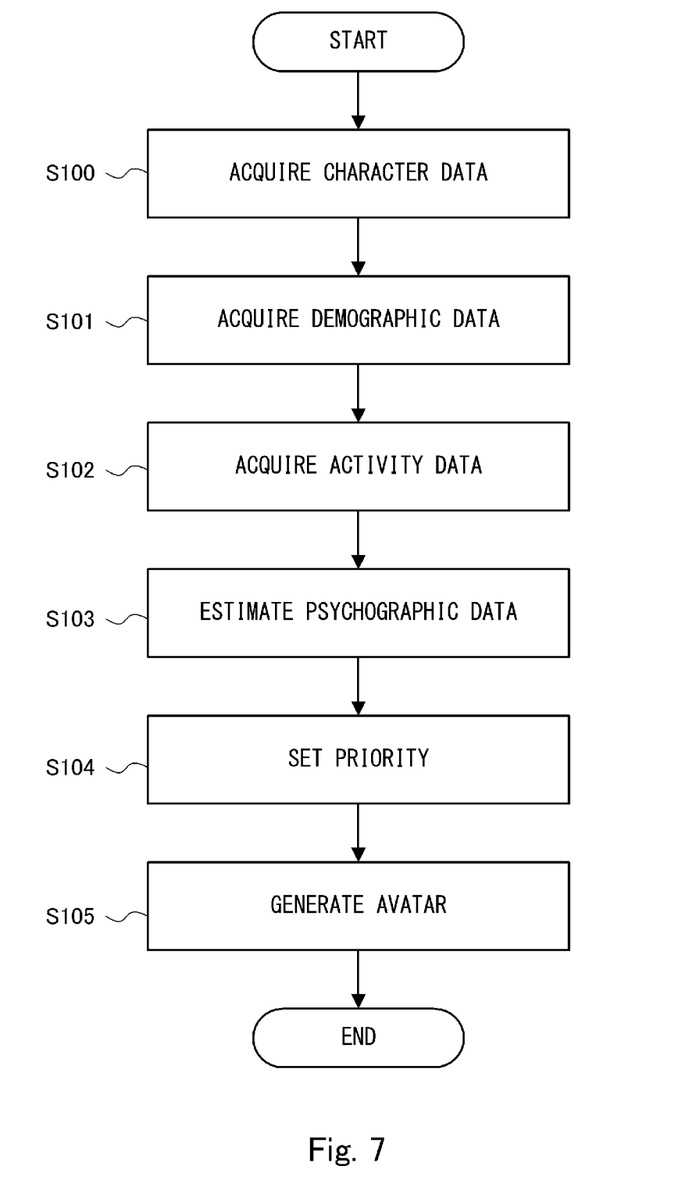
FIG. 7 is a flowchart illustrating an example of an operation flow of the avatar generation apparatus according to the present disclosure.

In step S100, the data acquisition unit 101 acquires character data.

However, the acquisition of the character data may not be performed.

Next, in step S101, the data acquisition unit 101 acquires demographic data. However, the acquisition of the demographic data may not be performed.

Next, in step S102, the data acquisition unit 101 acquires the activity data of the user.

Next, in step S103, the data estimation unit 102 estimates the psychographic data of the user from the activity data of the user acquired in step S102.

Next, in step S104, the priority setting unit 103 sets a priority for the character data, the demographic data, and the psychographic data.

Next, in step S105, the avatar generation unit 105 generates an avatar of the user by using the data acquired in steps S100, S101, and S103. At this time, the avatar generation unit 105 generates the avatar according to the priority set in step S104. The avatar generation unit 105 may transmit the generated avatar data to the user terminal 300.

Although the operation example of the avatar generation apparatus 100 has been described above, the flowchart illustrated in FIG. 7 is merely an example of the operation. For example, the steps described above can be rearranged in order of execution so long as there is no technical inconsistency. Further, two or more steps may be performed in parallel. Further, the setting of the priority may be omitted. In such a case, the avatar generation apparatus 100 may not include the priority setting unit 103. Further, the processing of step S100 or S101 may be omitted.

The first example embodiment has been described above. According to the avatar generation apparatus 100, the data estimation unit 102 estimates the psychographic data of the user from the activity data of the user acquired by the data acquisition unit 101. Then, the avatar generation unit 105 generates an avatar by using the estimated data. Therefore, the avatar generation apparatus 100 is able to generate an avatar suitable for the user without acquiring the psychographic data from the user or another system.

Second Example Embodiment

Figure 8:
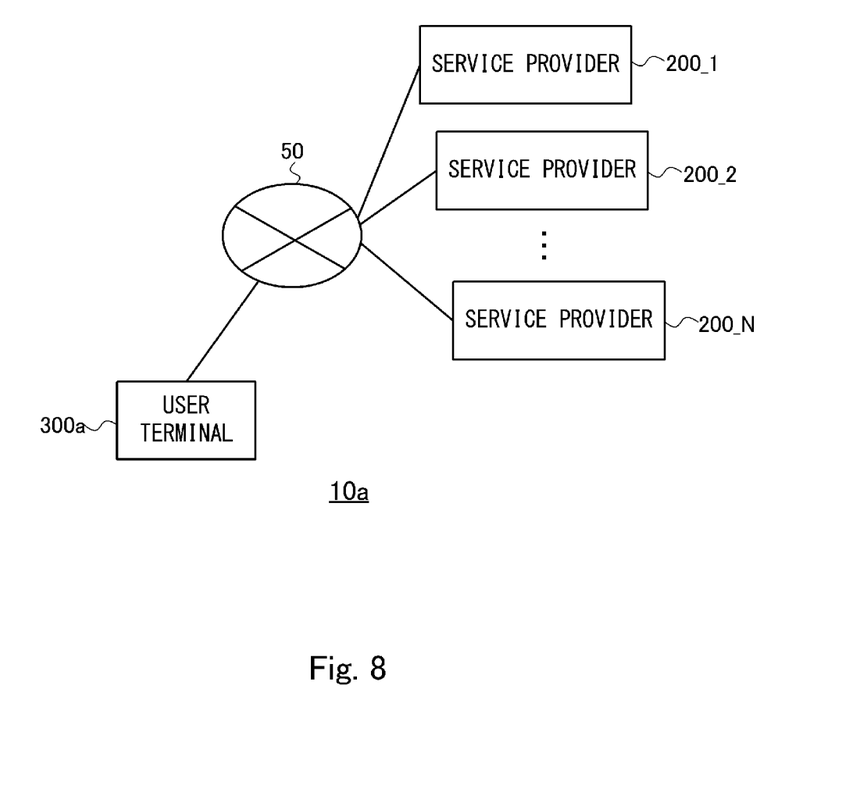
FIG. 8 is a block diagram illustrating a configuration example of an information processing system according to the present disclosure.

Next, a second example embodiment will be described. Hereinafter, differences from the first example embodiment will be described, and description of the same configuration and processing as in the first example embodiment will be omitted as appropriate. A configuration example of an information processing system 10a will be described with reference to FIG. 8. As illustrated in FIG. 8, the information processing system 10a includes service providers 200 and a user terminal 300a. In the first example embodiment, the avatar generation apparatus 100 is included in the information processing system 10 as an apparatus different from the user terminal 300. However, the function of the avatar generation apparatus 100 may be provided in the user terminal 300. That is, in the configuration illustrated in FIG. 8, the user terminal 300a is different from the user terminal 300 according to the above-described first example embodiment in that the user terminal 300a has the function of the avatar generation apparatus 100. Note that, the user terminal 300a has the function of the avatar generation apparatus 100, and therefore may be referred to as an avatar generation apparatus. Although FIG. 8 illustrates a case where all of the functions of the avatar generation apparatus 100 are provided in the user terminal 300a, only a part of the functions of the avatar generation apparatus 100 may be provided in the user terminal 300a.

According to the present example embodiment, the same effects as those of the first example embodiment can be acquired. Further, according to the present example embodiment, an avatar can be generated without transmitting data related to the user to an external device, and thus the avatar can be generated more securely.

Modified Example of Second Example Embodiment

Further, the second example embodiment can be modified as follows. In the above-described example embodiment, the data acquisition unit 101 acquires the activity data regarding the use of a service provided by the service provider 200 from the service provider 200, but does not necessarily need to acquire the activity data from the service provider 200. For example, the data acquisition unit 101 may acquire the activity data stored in the memory 71 of the user terminal 300 as log data when a service is being used. Furthermore, the data acquisition unit 101 may acquire, from the user terminal 300, not only the activity data regarding the use of the service provided by the service provider 200 but also all of the data being used for generating the avatar. That is, the data acquisition unit 101 may acquire all of the activity data, the demographic data, and the character data by reading such data from a storage device such as the memory 71 of the user terminal 300 or by observing such data by a sensor provided in the user terminal 300.

Although the present disclosure has been described with reference to the example embodiments, the present disclosure is not limited to the above. Various modifications that can be understood by a person skilled in the art within the scope of the disclosure can be made to the configuration and details of the present disclosure.

For example, in the above-described example embodiments, the avatar generation unit 105 generates an avatar by selecting part data as an example, but the avatar generation unit 105 may generate an avatar by using any other technique. That is, the avatar may be generated by a method other than the selection of a part. For example, any artificial intelligence (AI) technique may be used for determining appearance features of the avatar.

The whole or part of the example embodiments disclosed above can be described as, but not limited to, the following supplementary notes. Some or all of elements (e.g., structures and functions) specified in Supplementary notes 2 to 12 dependent on Supplementary note 1 may also be dependent on Supplementary note 13 and Supplementary note 14 in dependency similar to that of Supplementary notes 2 to 12 on Supplementary note 1. Some or all of elements specified in any of Supplementary notes may be applied to various types of hardware, software, and recording means for recording software, systems, and methods.

(Supplementary Note 1)

An avatar generation apparatus including:
a data acquisition unit configured to acquire activity data of a user;
a data estimation unit configured to estimate psychographic data of the user from the activity data of the user being acquired by the data acquisition unit; and
an avatar generation unit configured to determine an appearance feature of an avatar by using the psychographic data estimated by the data estimation unit and thereby generate an avatar of the user.

(Supplementary Note 2)

The avatar generation apparatus according to supplementary note 1, wherein
the data acquisition unit further acquires at least one of character data and demographic data of the user, and
the avatar generation unit determines an appearance feature of the avatar by further using at least one of the character data and the demographic data of the user being acquired by the data acquisition unit and thereby generates an avatar of the user.

(Supplementary Note 3)

The avatar generation apparatus according to supplementary note 2, further including a priority setting unit configured to set a priority for a plurality of types of data to be used for determining an appearance feature of the avatar, wherein the avatar generation unit generates the avatar according to the priority.

(Supplementary Note 4)

The avatar generation apparatus according to supplementary note 3, wherein
the priority setting unit sets a plurality of patterns of combination of priorities for a plurality of types of data to be used for determining an appearance feature of the avatar, and
the avatar generation unit generates, for each of the plurality of patterns of combination of priorities, the avatar according to the priority, and accepts an instruction for selecting any of the generated avatars from the user.

(Supplementary Note 5)

The avatar generation apparatus according to supplementary note 3 or 4, wherein
the priority setting unit accepts an instruction for specifying the priority from the user, and
the avatar generation unit generates the avatar according to the priority set by the instruction.

(Supplementary Note 6)

The avatar generation apparatus according to any one of supplementary notes 1 to 5, wherein the avatar generation unit generates an avatar having a predetermined appearance feature only when a predetermined piece of the activity data is acquired.

(Supplementary Note 7)

The avatar generation apparatus according to any one of supplementary notes 1 to 6, wherein the activity data include data representing an activity of purchasing a product or a service by the user.

(Supplementary Note 8)

The avatar generation apparatus according to any one of supplementary notes 1 to 7, wherein the activity data include data representing an activity of viewing a video or listening to music by the user.

(Supplementary Note 9)

The avatar generation apparatus according to any one of supplementary notes 1 to 8, wherein the activity data include data representing an activity related to the user's exercise.

(Supplementary Note 10)

The avatar generation apparatus according to any one of supplementary notes 1 to 9, wherein the activity data include data representing an activity of browsing a website by the user.

(Supplementary Note 11)

The avatar generation apparatus according to any one of supplementary notes 1 to 10, wherein the activity data include data representing an activity of inputting information to a service provided on a network.

(Supplementary Note 12)

The avatar generation apparatus according to any one of supplementary notes 1 to 11, wherein the character data are an image acquired by capturing an appearance of the user.

(Supplementary Note 13)

An avatar generation method including:
acquiring activity data of a user;
estimating psychographic data of the user from the acquired activity data of the user; and
determining an appearance feature of an avatar by using the estimated psychographic data and thereby generating an avatar of the user.

(Supplementary Note 14)

A non-transitory computer readable medium storing a program for causing a computer to execute:
a data acquisition step of acquiring activity data of a user;

a data estimation step of estimating psychographic data of the user from the activity data of the user being acquired in the data acquisition step; and an avatar generation step of determining an appearance feature of an avatar by using the psychographic data estimated in the data estimation step and thereby generating an avatar of the user.

According to the present disclosure, it is possible to provide an avatar generation apparatus, an avatar generation method, and a program that can reduce a user's time and effort when generating an avatar suitable for the user.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims. And each embodiment can be appropriately combined with at least one of embodiments.

Each of the drawings or figures is merely an example to illustrate one or more example embodiments. Each figure may not be associated with only one particular example embodiment, but may be associated with one or more other example embodiments. As those of ordinary skill in the art will understand, various features or steps described with reference to any one of the figures can be combined with features or steps illustrated in one or more other figures, for example, to produce example embodiments that are not explicitly illustrated or described. Not all of the features or steps illustrated in any one of the figures to describe an example embodiment are necessarily essential, and some features or steps may be omitted. The order of the steps described in any of the figures may be changed as appropriate.

What is claimed is:

1. An avatar generation apparatus comprising:
   at least one memory storing instructions; and
   at least one processor configured to execute the instructions to:
      acquire activity data of a user and at least one of character data and demographic data of the user;
      estimate psychographic data of the user from the acquired activity data of the user;
      set a plurality of patterns of combination of priorities for a plurality of types of data to be used for determining an appearance feature of an avatar;
      determine the appearance feature of the avatar by using the estimated psychographic data and at least one of the acquired character data and the acquired demographic data of the user and thereby generate the avatar of the user; and
      generate, for each of the plurality of patterns of combination of priorities, the avatar according to priority, and accept an instruction for selecting any of the generated avatars, from the user.

2. The avatar generation apparatus according to claim 1, wherein the processor is further configured to execute the instructions to:
   accept an instruction for specifying the priority, from the user; and
   generate the avatar according to the priority set by the instruction.

3. The avatar generation apparatus according to claim 1, wherein the processor is further configured to execute the instructions to generate an avatar having a predetermined appearance feature only when a predetermined piece of the activity data is acquired.

4. The avatar generation apparatus according to claim 1, wherein the activity data include data representing an activity of purchasing a product or a service by the user.

5. The avatar generation apparatus according to claim 1, wherein the activity data include data representing an activity of viewing a video or listening to music by the user.

6. The avatar generation apparatus according to claim 1, wherein the activity data include data representing an activity related to the user's exercise.

7. The avatar generation apparatus according to claim 1, wherein the activity data include data representing an activity of browsing a website by the user.

8. The avatar generation apparatus according to claim 1, wherein the activity data include data representing an activity of inputting information to a service provided on a network.

9. The avatar generation apparatus according to claim 1, wherein the character data are an image acquired by capturing an appearance of the user.

10. An avatar generation method comprising:
    acquiring activity data of a user and at least one of character data and demographic data of the user;
    estimating psychographic data of the user from the acquired activity data of the user;
    setting a plurality of patterns of combination of priorities for a plurality of types of data to be used for determining an appearance feature of an avatar; and
    determining the appearance feature of the avatar by using the estimated psychographic data and at least one of the acquired character data and the acquired demographic data of the user and thereby generating the avatar of the user,
    wherein, the generating the avatar comprises generating, for each of the plurality of patterns of combination of priorities, the avatar according to priority, and accepting an instruction for selecting any of the generated avatars, from the user.

11. The avatar generation method according to claim 10, wherein the avatar generation method comprises:
    accepting an instruction for specifying the priority, from the user; and
    generating the avatar according to the priority set by the instruction.

12. The avatar generation method according to claim 10, wherein the avatar generation method comprises generating an avatar having a predetermined appearance feature only when a predetermined piece of the activity data is acquired.

13. The avatar generation method according to claim 10, wherein the activity data include data representing an activity of purchasing a product or a service by the user.

14. A non-transitory computer readable medium storing a program for causing a computer to execute:
    a data acquisition operation of acquiring activity data of a user and at least one of character data and demographic data of the user;
    a data estimation operation of estimating psychographic data of the user from the activity data of the user being acquired in the data acquisition operation;
    a priority setting operation of setting a plurality of patterns of combination of priorities for a plurality of types of data to be used for determining an appearance feature of an avatar; and
    an avatar generation operation of determining the appearance feature of the avatar by using the psychographic data estimated in the data estimation operation and thereby generating an avatar of the user,
wherein, the avatar generation operation comprises generating, for each of the plurality of patterns of combination of priorities, the avatar according to priority, and accepting an instruction for selecting any of the generated avatars, from the user.

* * * * *